United States Patent [19]

Reimer

[11] 3,731,636
[45] May 8, 1973

[54] CONVEYOR
[76] Inventor: Alfred Reimer, 2048 Rebecca St., Oakville, Ontario, Canada
[22] Filed: June 1, 1970
[21] Appl. No.: 42,034

[30] Foreign Application Priority Data
June 5, 1969 Canada...................................053563

[52] U.S. Cl. .............................104/172 B, 104/44
[51] Int. Cl.............................................B65g 39/20
[58] Field of Search ......................104/172 B, 18, 44

[56] References Cited
UNITED STATES PATENTS

| | | |
|---|---|---|
| 3,530,801 | 9/1970 | Murillo..............................104/172 B |
| 3,511,187 | 5/1970 | Hanna................................104/172 B |
| 3,010,410 | 11/1961 | Daniels..............................104/137 |
| 3,424,103 | 1/1969 | Suraci...............................104/172 B |
| 3,196,806 | 7/1965 | Brunder.............................104/172 B |
| 3,526,193 | 9/1970 | Vani .................................104/172 B |

Primary Examiner—Gerald M. Forlenza
Assistant Examiner—Robert Saifer
Attorney—Lawrence I. Field

[57] ABSTRACT

A device for moving a wheeled vehicle along a predetermined path having a track alongside the path with pusher means operating slidably along the track and arranged to push against the wheel of a vehicle in the path to move the vehicle along the path and mechanism to move the pusher means slidably along the track.

4 Claims, 14 Drawing Figures

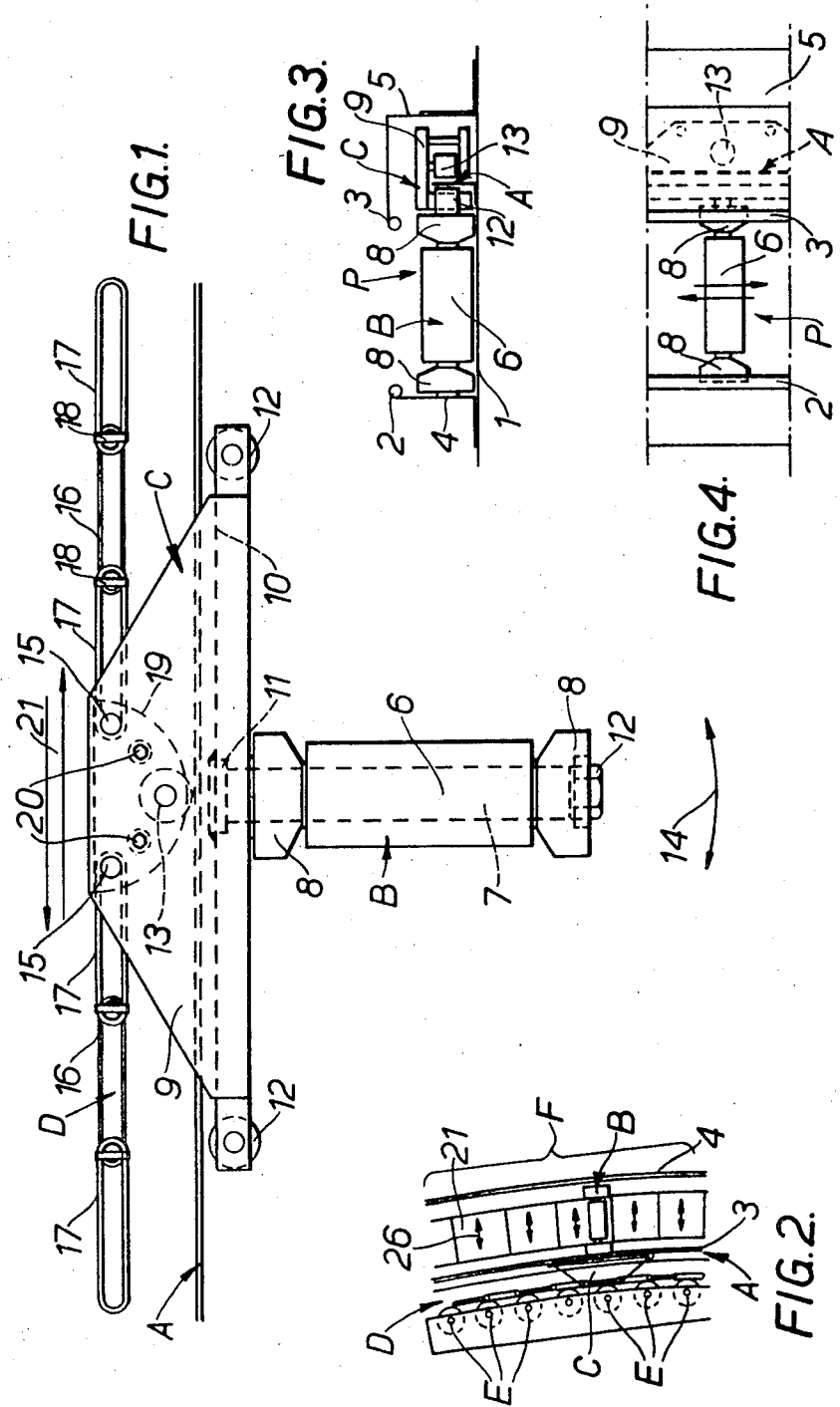

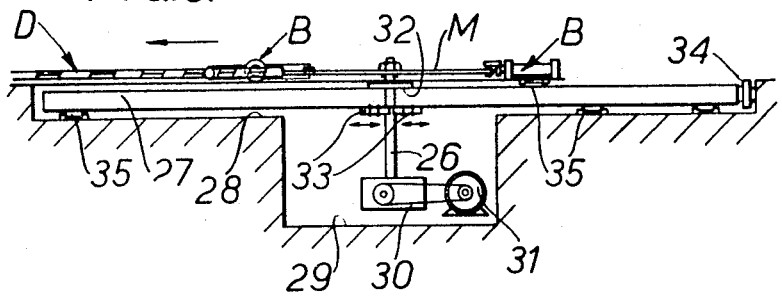
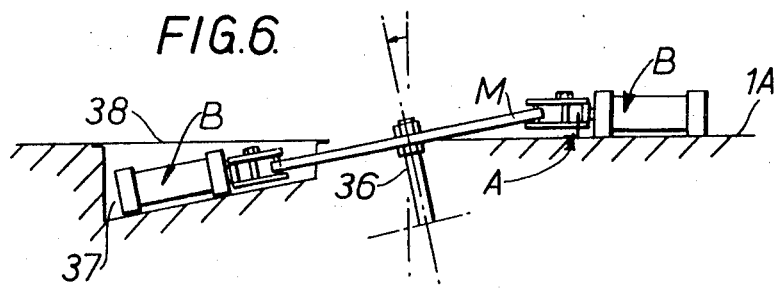
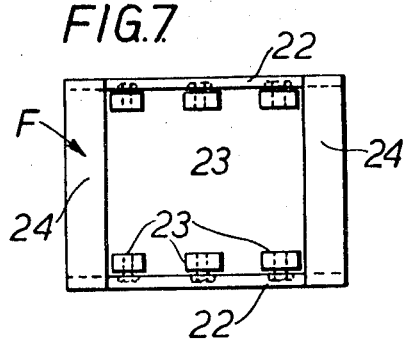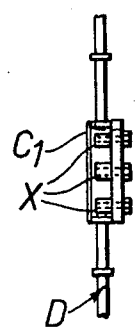
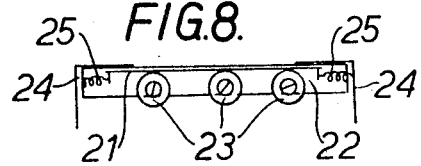
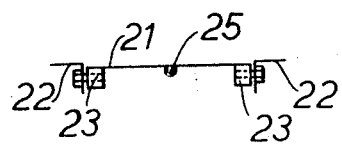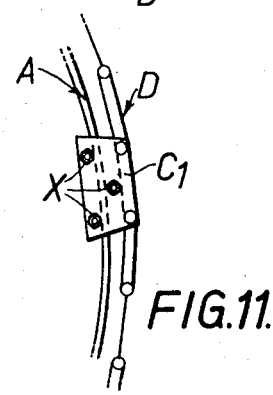

CONVEYOR

This invention relates to a conveying device for moving a wheeled vehicle along a predetermined path of travel.

BACKGROUND OF THE INVENTION

1. Field of the Invention

The invention relates to conveyors and in particular conveyors for moving a vehicle along a desired path of travel.

The requirement for moving a wheeled vehicle along a predetermined path of travel, is encountered in assembly line operation on motor vehicles in manufacturing plants, car maintenance or car washing facilities where a vehicle is driven into a building at one end of a predetermined path of travel and with means provided to move the vehicle along the predetermined path while manufacturing, maintenance or washing operations are carried out on the vehicle.

2. Description of the Prior Art

The majority of the prior art has been developed around some form of endless chain with a grab that may be connected to the endless chain at one end and affixed at its opposite end to the vehicle so that movement of the endless chain will draw the vehicle along the predetermined desired path.

Difficulty has been encountered, however, in affixing or detaching the grab device from both the chain and the vehicle and in an effort to overcome this, various pushing devices fixed to the chain to push against the body of a vehicle, have been developed. While such devices have been satisfactory in that they eliminate the necessity for fixing a grab to the vehicle, there is the problem that damage to the vehicle finish can result if great care is not taken in the use of such pushing devices.

U.S. Pats. Nos. 3,233,557 to A. D. Rickel and 3,196,806 to E. C. Brunder describe driving devices consisting of a roller that is moved along a predetermined path of travel while fixed to an endless chain, the roller being adapted to bear against a wheel of a vehicle and thereby move the vehicle along the path of travel. While these devices have been satisfactory in moving the vehicle, they have suffered from the problem of a large number of operating parts and considerable abrasion, friction and frequent malfunction of the apparatus results. This is noted particularly when the devices are used for moving vehicles in a car wash where large amounts of dirt and grit as well as moisture is present.

A further disadvantage in such devices is that they are only adaptable for moving a vehicle in one direction and may only be driven over in one direction. Moreover, such devices only contemplate moving the vehicle in a straight path of travel and it is not possible to use the device as described when the vehicle is to be moved in a curved path.

Further, such devices must be used with considerable care and must be moved out of the path of the vehicle when not in use or, damage to the roller drive mechanism can result.

SUMMARY OF THE INVENTION

The present device provides a mechanism for moving a wheeled vehicle along a predetermined path of travel and includes the combination of: a track positioned alongside the path of travel, pusher means adapted to push against the wheels of a vehicle located in the path of travel and thereby move the vehicle along the path, means for connecting the pusher means slidably on the track with such means including means cooperating with the track to restrict lateral movement of the pusher means with respect to the path of travel and, means for driving the pusher means, including an endless chain connected to the pusher means and with means to drive the chain.

BRIEF DESCRIPTION OF THE DRAWINGS

In the drawings wherein like numbers refer to like or similar parts:

FIG. 1 is a broken away enlarged top plan view illustrating one of the pusher means connected to portions of the track and drive means;

FIG. 2 is a broken away top plan view showing a portion of curved track with one of the pusher means and illustrating movement of the correlators;

FIG. 3 is a sectional end view of the mechanism illustrated in FIG. 1;

FIG. 4 is a sectional top plan view of the mechanism of FIG. 3;

FIG. 5 is a sectional elevation of the turntable mechanism enabling a right-angle turn in the path of travel of a vehicle moved by the conveyor;

FIG. 6 is a sectional elevation of an embodiment of the conveyor illustrating the return path of the conveyor positioned below floor level;

FIG. 7 is a plan view from beneath the correlator mechanism for compensating for sideways movement of a vehicle being moved around a curve in the path of travel;

FIG. 8 is a side elevation of the mechanism illustrated in FIG. 7;

FIG. 9 is an end elevation of the mechanism illustrated in FIG. 8;

FIGS. 10 and 11 are cross sectional and plan views of the drive chain guide;

DESCRIPTION OF THE PREFERRED EMBODIMENT

Figure 12:
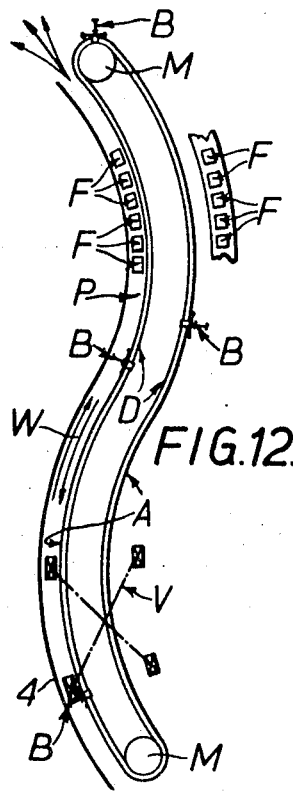
FIG. 12 is a plan diagrammatic view illustrating a curved path of travel of the conveyor.
Figure 13:
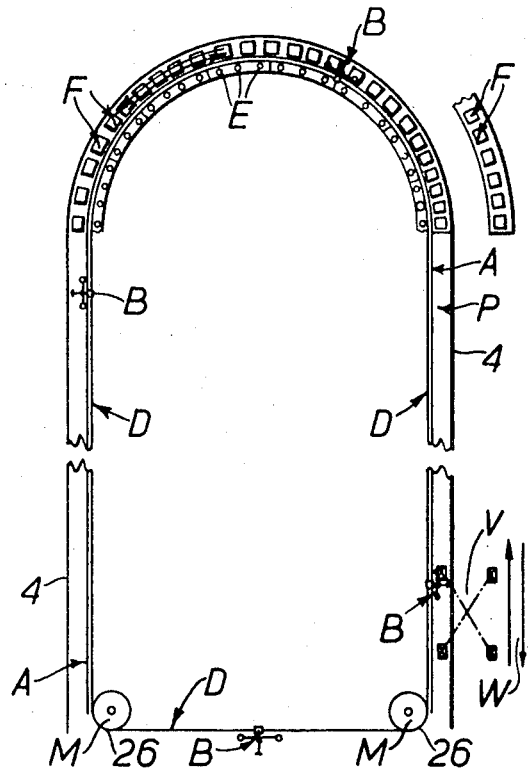
FIG. 13 is another diagrammatic plan view illustrating a path of travel through 180° and through two right-angle turns.

Turning now to the specific embodiments illustrated in the drawings and in particular in FIGS. 12 and 13, the conveyor of the present invention is adapted to move a vehicle indicated generally at V along a path P which is shown S-shaped in FIG. 12 and more or less rectangular with a gradual 180° curve at one end in FIG. 13. As indicated by arrows W, the vehicle V may be moved in either direction along the path P. The vehicle V is moved along the path by pusher means B sliding on track A and driven by drive means D. Drive means D is in the form of an endless chain operating around idlers M, one of which may be driven by a suitable motor or other drive means.

The track A comprises a vertical member secured rigidly to a base 1, vertical with respect thereto and parallel to the predetermined path P. Path P is defined by spaced apart parallel guide rails 2 and 3 at opposite sides of the path, the guide rail 2 located at the top of a fence 4 on one side of the path P and the guide rail 3 located at the end of the housing member 5 which is adapted to act as a protective cover for the track A, connecting means C and drive means D.

The pusher means B includes an elongated cylindrical roller 6, mounted rotatably on axle 7 between supporting wheels 8—8 which rollably contact the base plate 1 to support the roller 6 in the path P. While not illustrated in the drawings, it will be obvious that thrust bearings would be provided between the contacting surfaces of the supporting wheels 8 and the elongated roller 6 to allow independent rotation of the wheels 8 and roller 6 with as little friction as possible.

The means C for connecting the pusher means B slidably on the track A, includes a plate formed with a horizontal portion 9 and a vertical portion 10. The vertical portion 10 lies alongside of the track A while the horizontal portion passes over the track A for interconnection with the drive means D as will be described later. The roller axle 7 is fixed rigidly at its one end 11 to the vertical portion 10 to project at right-angles therefrom and is provided with a fastening nut 12 at its opposite end to secure the wheels 8 and roller 6 on the axle 7.

Sliding connection of the roller means B with the track A is provided by a pair of vertically positioned rollers 12—12 depending from the portion 9 on one side of the track A, and a roller 13 also depending from the portion 9 and on the opposite side of the track A. This will provide suitable rolling contact between the pusher member B and the track A and, at the same time, the rollers 12 bear against the track at points spaced from the pusher, to restrict lateral movement of the axle 7 with respect to path P, as indicated by arrow 14.

Drive means for the wheel pusher B indicated generally at D includes an endless chain comprised of links 16 and 17 interconnected with hinge pins 18. A pair of links 17—17 are attached to the horizontal portion 9 by pins 15 which substitute for the conventional linking pins 18. The pins 15 are spaced so that the horizontal portion 9 will act in place of a link 16 at one side of the chain. At the opposite side, the chain is connected through a suitable half-moon section 19 coupled to the pins 15 and to additional stiffening pins 20 extending between the half-moon section 19 and the horizontal portion 9.

With this construction, it will be obvious that, as the drive means D is moved in either of the directions indicated by arrows 21, there will be corresponding movement of the wheel pusher means B along the track A.

When a vehicle V is being moved along a predetermined straight path, there will be little sideways movement of the vehicle to create additional friction. However, when the vehicle is being moved along a curved path as illustrated in FIGS. 12 and 13, there will be sideways movement of the vehicle generating friction at the curved portions of the track. To compensate for this, there is provided correlating means indicated generally at F. The correlating means F includes a plurality of correlators, one of which is illustrated in FIGS. 7, 8, and 9. The correlator F includes a supporting plate 21 connected between side frames 22 and supported on rollers 23. The frames 22 slide on end frame 24 while supported on the rollers 23, the top plate 21 being normally positioned between the end frames by centering springs 25. The correlators F are embedded in the predetermined path P at curves in the path, with the plates 21 level with the base plate 1. As a vehicle wheel is pushed around a curve as indicated in FIGS. 12 and 13, the plates 21 will move in the lateral direction indicated by the arrow 26 to correlate sideways movement of the vehicle and reduce friction occasioned by such sideways movement.

Additional support for the chain drive means D is desirable when it is passing around a concave curve with respect to the track A. This support is provided by a plurality of thrust rollers E which are positioned in a curve corresponding to the curve of the track A to provide support and guidance for the chain drive means D as it passes around the curve. This construction may be seen clearly on reference to FIG. 2.

Support for the chain drive means D as it passes around a convex curve with respect to the track A, will be seen in FIGS. 10 and 11. Connecting means C1 similar to the connecting means C is interconnected with the drive means D in a similar manner to connecting means C. Three rollers X, one on one side of the track A and two on the opposite side of the rail are provided. These rollers are similar to the rollers 12 and 13 illustrated in FIG. 1 and function in substantially the same manner to support the chain drive means D in its passage around the convex curve described by the track A.

Figure 14:
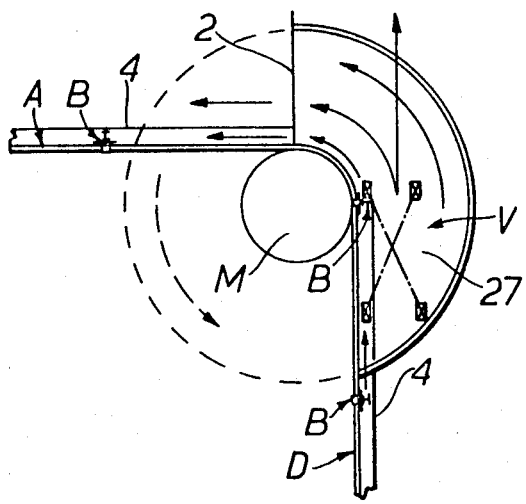
FIG. 14 is a broken away top plan view of the mechanism illustrated in FIG. 5.

The means to permit movement of a vehicle V around a rightangle turn in the predetermined path as shown in FIG. 13, will be described with reference to FIGS. 5 and 14 in the drawings.

The conveyor sprocket M is connected coaxially on an elongated center shaft 26 to a turntable 27. The turntable 27 is located in a suitable depression 28 whereby a vehicle V being moved along the predetermined path by the pusher means B will be moved onto the turntable 27. The center shaft 26 extends into a further depression 29 and is connected therein to a gear box 30 and drive motor 31 for rotating the turntable 27.

To provide adequate support of the sprocket M with relation to the turntable 27, there is provided a thrust bearing 32 between the sprocket and the turntable and to obtain drive of the turntable, there is provided a clutch 33 which, in this embodiment, is a remotely controlled magnetic clutch. A brake 34 acting on the rim of the turntable 27 is also provided to permit stopping the turntable as desired.

Adequate support of the turntable 27 with relation to the depression 28 is provided by rollers or other anti-friction means 35 strategically located in the depression 28 for contact with the turntable.

Conventionally, an endless conveyor is operated with its forward end return paths on the same level as, for example, in the embodiments illustrated in FIGS. 12 and 13. However, in some instances it may be desirable to operate the conveyor with the return path of the conveyor at a lower level than the forward path and in this instance the embodiment illustrated in FIG. 6 is utilized. In this embodiment, the conveyor sprocket M is operated with its shaft 36 at an angle to the vertical so the conveyor on its return path will travel in the channel 37 in the floor 1a on which the conveyor is operated. The channel 37 is covered with a plate 38 or other covering which preferably is removable to permit repair or lubrication to the conveyor operating in the channel 37.

To operate the invention, it is necessary first to determine the length and configuration of the path P around which it is desired to move a vehicle. Once the path is determined, a track A is secured rigidly alongside the path and guide rails 2 and 3 are suitably supported on opposite sides of the path to define the path throughout its entire length. Pusher means B and chain drive means D are then installed with the chain drive means D travelling around suitable idler and drive sprockets M and the pusher means B interconnected with the drive means D and slidably connected by rollers 12 and 13 to the track A.

Thereafter, as power is applied to one of the sprockets M, the pusher means B will be moved around the path P. When a vehicle V has a wheel located in the path P, the roller 6 of the pusher means B will be moved against the wheel to push the vehicle along the path P.

Of course, if the vehicle is to be moved around a right-angled turn in the path P, a turntable 27 and its associated mechanism will be provided at the right-angled turn. Similarly, if the path P is curved, suitable correlators F, to adjust for sideways movement of the vehicle, will be provided. Thrust rollers E to support the drive chain means around a concave curve will be provided, together with auxiliary connecting means C1 and rollers X to support the drive means D around a convex curve in the guide means A.

With the drive means B in the form illustrated, a vehicle V may be driven onto or off the path P as desired and the wheels of the vehicle V will pass over the roller 6 without damage to the roller.

At the same time, the pusher means B, track A and drive means D may be operated in locations of high moisture as, for example, in a car wash or other cleaning establishment and the open construction will enable adequate lubrication of the moving parts and clearing of any dirt or debris from the mechanism that might interfere with the efficient operation of the device.

I claim:

1. In a device for moving a wheeled vehicle along a predetermined path of travel, the combination of:
    a. track means positioned alongside the path;
    b. pusher means in the form of an elongated roller extending across the path and supported rotatably above the path through wheel means at the opposite ends of the roller in contact with the path, such pusher means adapted to push against vehicle wheels located in the path to move the vehicle along the path;
    c. means for connecting one end of the pusher means for slidable operation on the track means, such means including means cooperating with the track means to restrict horizontal swinging movement of the pusher means when the pusher is moved in either direction along the said path;
    d. means for driving the pusher means, such means including an endless chain connected to the pusher means;
    e. means to drive the chain; and
    f. correlating means embedded in the path to correlate lateral movement of a vehicle being moved around a curve in the path, with forward movement of the vehicle along the path, said correlating means including a plate supported on rollers, such plate and rollers adapted to be embedded in the path whereby the plate will move laterally on the supporting rollers with respect to the path, to reduce friction of a vehicle wheel located in the path and moving laterally with respect to the path.

2. The device as claimed in claim 1, wherein the means for connecting one end of the pusher means for slidable operation on the track means includes a plate extending from the end of the pusher means over the track means with a plurality of rollers depending from the plate to lie on opposite sides of the track means and in contact therewith.

3. The device as claimed in claim 1, wherein the rollers are spaced along the track means in opposite directions from the pusher, the spacing of the rollers along the track means being sufficient to restrict lateral swinging movement of the pusher when the pusher is moved in either direction along the path.

4. In a device for moving a wheeled vehicle along a predetermined path of travel, the combination of:
    a. track means positioned alongside the path;
    b. pusher means in the form of an elongated roller extending across the path and supported rotatably above the path through wheel means at the opposite ends of the roller in contact with the path, such pusher means adapted to push against vehicle wheels located in the path to move the vehicle along the path;
    c. means for connecting one end of the pusher means for slidable operation on the track means, such means including means cooperating with the track means to restrict horizontal swinging movement of the pusher means when the pusher is moved in either direction along the said path;
    d. means for driving the pusher means, such means including an endless chain connected to the pusher means;
    e. means to drive the chain, wherein the predetermined path of travel includes a right-angled turn in the path and means embedded in the path to convey a vehicle around the right-angled turn, said last named means including a turntable adapted to receive a vehicle from a first path, convey the vehicle through a right-angled turn and to discharge the vehicle to a second path at right angles to the first path and means to rotate the turntable.

* * * * *